US008923318B2

(12) United States Patent  
Kronestedt et al.

(10) Patent No.: US 8,923,318 B2
(45) Date of Patent: Dec. 30, 2014

(54) WIRELESS COMMUNICATION SYSTEM AND METHOD FOR ASSIGNING A CHANNEL IN SAID WIRELESS COMMUNICATION SYSTEM

(75) Inventors: Fredric Kronestedt, Ekero (SE); Bo Hagerman, Tyreso (SE); Kimmo Hiltunen, Esbo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 907 days.

(21) Appl. No.: 13/121,746

(22) PCT Filed: Oct. 2, 2008

(86) PCT No.: PCT/SE2008/051116
§ 371 (c)(1),
(2), (4) Date: Jul. 14, 2011

(87) PCT Pub. No.: WO2010/039072
PCT Pub. Date: Apr. 8, 2010

(65) Prior Publication Data
US 2011/0261711 A1 Oct. 27, 2011

(51) Int. Cl.
*H04W 36/00* (2009.01)
*H04W 72/08* (2009.01)
*H04B 7/06* (2006.01)
*H04B 7/08* (2006.01)
*H04W 72/04* (2009.01)

(52) U.S. Cl.
CPC ........... *H04W 72/082* (2013.01); *H04B 7/0608* (2013.01); *H04B 7/0805* (2013.01); *H04W 36/0088* (2013.01); *H04W 72/0413* (2013.01)
USPC .......................................... 370/431; 455/442

(58) Field of Classification Search
CPC .. H04W 36/00–36/0094; H04W 36/06–36/16; H04W 52/04–52/18
USPC ........ 370/73, 422.1, 436, 447, 522, 560, 561, 370/562.1, 431; 455/329, 331, 334, 335, 455/342, 442, 443
See application file for complete search history.

(56) References Cited

U.S. PATENT DOCUMENTS 6,542,484 B1 * 4/2003 Ovesjo et al. ................. 370/335
2002/0071384 A1 * 6/2002 Hall et al. ..................... 370/203

(Continued)

OTHER PUBLICATIONS

"3rd Generation Partnership Project; Technical Specification Group Radio Access Network; Physical channels and mapping of transport channels onto physical channels (FDD) (Release 8)" 3GPP TS 25.211 V.8.2.0, Sep. 24, 2008, pp. 1-56, XP002538154.
Dai, et al., "Capacity Analysis i n CDMA Distributed Antenna Systems" IEEE Transactions on Wireless Communications, vol. 4, No. 6, Nov. 2005, pp. 2613-2620, XP002538153.
Ericsson: "A discussion on some technology components for LTE-Advanced" 3GPP Draft; R1-082024 {LTE-Advanced Technology Components}, 3rd Generation Partnership Project (3GPP), vol. RAN WG1, Apr. 30, 2008, 11 pages, XP050110365.

*Primary Examiner* — Michael Thier
*Assistant Examiner* — Prince A Mensah
(74) *Attorney, Agent, or Firm* — Rothwell, Figg, Ernst & Manbeck, P.C.

(57) ABSTRACT

The present invention relates to a wireless communication system. The wireless communication system comprises an antenna unit comprising a plurality of antenna elements, selecting means arranged to select at least one of the antenna elements as serving antenna for communication with user equipment, means for code allocation arranged to allocate a code for channel estimation support for the communication between the serving antenna and the user equipment, and a control unit arranged to control the communication based on the selected serving antenna and the allocated code. The means for code allocation are arranged to assign the code to said user equipment. The control unit is arranged to control the serving antenna so as to transmit the code assigned to the user equipment.

19 Claims, 4 Drawing Sheets

(56) References Cited

U.S. PATENT DOCUMENTS

| | | |
|---|---|---|
| 2003/0114162 A1* | 6/2003 | Chheda et al. ............... 455/447 |
| 2003/0117980 A1* | 6/2003 | Kim et al. ................... 370/332 |
| 2004/0033787 A1* | 2/2004 | Weber et al. .................. 455/78 |
| 2007/0104150 A1* | 5/2007 | Fernandez-Corbaton et al. ............ 370/335 |
| 2007/0224987 A1* | 9/2007 | Ishii ............................. 455/436 |
| 2009/0252139 A1* | 10/2009 | Ludovico et al. ............ 370/342 |

\* cited by examiner

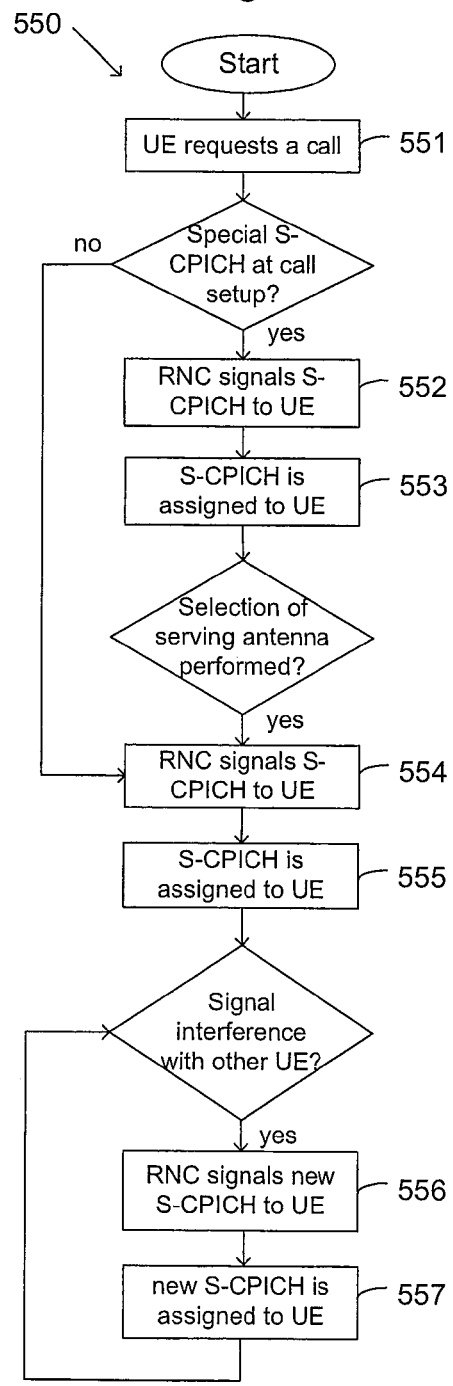

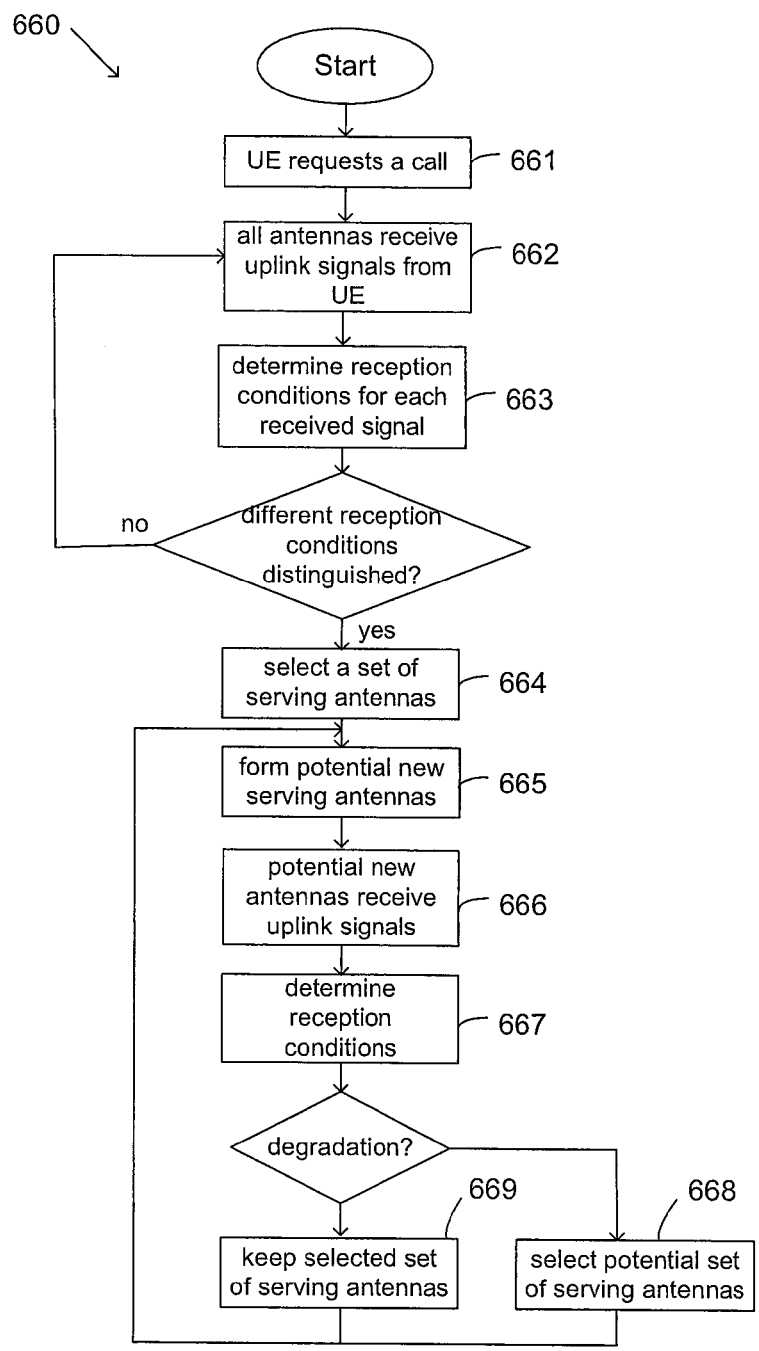

WIRELESS COMMUNICATION SYSTEM AND METHOD FOR ASSIGNING A CHANNEL IN SAID WIRELESS COMMUNICATION SYSTEM

CROSS REFERENCE TO RELATED APPLICATION(S)

This application is a 35 U.S.C. §371 National Phase Entry Application from PCT/SE2008/051116, filed Oct. 2, 2008, and designating the United States. The disclosure of which is incorporated herein in its entirety by reference.

TECHNICAL FIELD

The present invention relates to a wireless communication system and especially to assignment of a channel to user equipment in a wireless indoor communication system.

BACKGROUND

Distributed Antenna Systems (DAS) are commonly used for building indoor coverage of wireless systems. DAS is a network of spatially separated antennas or radiating cables connected to a common source. The antennas or radiating cables are distributed throughout the coverage area and are used for transmitting and receiving signals to/from user equipment. The antennas connected to the common source form a logical cell. The spatial distribution of the antennas provides for well defined coverage with good flexibility using a low output power compared to a single antenna scenario.

Since DAS is defining a logical cell, no conventional handover is needed when user equipment move in the area covered by the antenna system. An evolution of DAS is to introduce an intelligent antenna switching, confining the communication to just one or a few serving antennas in the close vicinity of the user equipment (instead of distributing the signals to/from all antennas). This technique is often referred to as a hub solution or RF switching. A significant interference and power reduction is provided when RF switching is applied With RF switching, it is still possible to avoid handover in the coverage area of the antenna system since the areas covered by means of RF switching would still be confined to one logical cell. In practice, common control channels are broadcasted from all antennas of the logical cell while dedicated and shared channels use RF switching. The serving antenna will hence be changed as the user equipment moves. A DAS with RF switching is hence similar to a macro cell adaptive antenna that switches or steers a beam to the communicating user equipment. Typically the tracking of user equipment could be based on an RF quality measure such as C/I measured at every antenna in uplink. Also, the document ERICSSON "A discussion on some technology components for LTE-advanced" 3GPP Draft R1-082024 Kansas City USA; 20080505 describes an LTE advanced system.

In WCDMA systems a pilot channel is a downlink channel typically having constant power and of a known bit sequence. The pilot channel (i.e. a predefined known signal at the receiver) is used for radio propagation channel estimation. The dedicated information transmitted to a specific receiver is in one example sent via a data transmission channel generated coherently in parallel with the pilot channel utilizing the same serving antenna(s). Accordingly, the data transmission channel experiences the same radio propagation environment as the pilot channel. The pilot channel acts as a phase reference for the data transmission channel. The estimated radio propagation channel can be used coherently at the receiver for detection of the dedicated data transmission. In WCDMA, a Common Pilot Channel (P-CPICH) and some other common control channels would typically be transmitted from all antennas to form and define a logical cell. Optionally, a Secondary Common Pilot Channel (S-CPICH) can be used either in the complete cell defined by the P-CPICH or in sub-areas of the cell as phase reference. In an RF switching indoor system context, an optional S-CPICH can be pre-defined to transmit from only one antenna (or a subset of antennas) of the logical cell and all or selected parts of the logical cell antennas can be assigned different S-CPICH which optionally can be used as phase reference instead of the P-CPICH. The power assignment to the S-CPICH is typically designed statically to support a user at the border of the designed coverage (i.e. a worst case assignment). Even if a user is close the antenna point, with very good quality, there may also be a user at the border prohibiting any potential power and interference savings via power control of the S-CPICH. When the primary CPICH is not used for a user for the purpose of providing a phase reference, the Radio Network Controller (RNC) is arranged to inform the user equipment accordingly.

When the user equipment is moving within the logical cell, it is assigned a new secondary CPICH if it is found that a new antenna is better for serving the user equipment. The RNC is arranged to determine when a new antenna is better suited to serve the user. The RNC is then arranged to assign the user equipment the new S-CPICH (assigned to the new antenna). Therefore, the S-CPICH re-configuration procedure is somewhat similar to performing handover between cells.

There is a latency involved in this operation (signalling between RNC and user equipment). It is desired to minimize the latency since it will degrade user experience. Quality degradation will occur if the wrong S-CPICH is used as phase reference. This problem can be especially severe in high mobility cases where a user quickly moves past a number of antennas. This may for example occur when the user is located in an elevator.

SUMMARY

One object of the present invention is to obviate at least some of the above mentioned problems and provide an improved wireless communication system.

This has in accordance with one example of the invention been achieved by means of a wireless communication system comprising an antenna unit comprising a plurality of antenna elements, means for code allocation arranged to allocate a code for channel estimation support for said communication between the serving antenna and the user equipment, and a control unit arranged to control the communication based on the selected serving antenna and the allocated code. The means for code allocation are arranged to assign the code to said user equipment. In one example, the codes are used as phase reference. The control unit is arranged to control the serving antenna so as to transmit the code assigned to the user equipment.

The fact that the code is assigned to the user equipment results in that the serving antennas for the user equipment can be changed, for example due to movements of the user equipment, without having to assign a new code to the user equipment. The assignment belongs to the user equipment and not to the serving antenna(s).

In one example, the wireless communication system is a WCDMA indoor system. In accordance therewith, a secondary pilot channel (S-CPICH) can be arranged to carry the code for channel estimation support.

The antenna selecting means are in one example arranged to continuously update the selection of serving antenna for said user equipment. The antenna selecting means are in one example arranged to select serving antenna for downlink communication.

In accordance with one embodiment of the invention, the transmission of the code for channel estimation support is power controlled.

The code allocation means can be arranged to determine interferences between communication channels to different pieces of equipment and to assign the same code to a plurality of pieces of equipment in consideration of said determined interferences.

Further, in one example, the code allocation means have access to a predetermined number of codes and a subset of said codes are assignable to only one piece of user equipment at the same time. Said subset of codes can be dedicated for a call setup phase.

The present invention also relates to a Radio Network Controller for a wireless communication system having an antenna unit with a plurality of antenna elements. The Radio Network Controller comprises selecting means arranged to select at least one of the antenna elements as serving antenna for communication with user equipment and means for code allocation arranged to allocate a code for channel estimation support for communication between said serving set of antennas and the user equipment. The means for code allocation are arranged to assign the code to said user equipment, and the selecting means are arranged to select the serving antenna for transmission of the code assigned to the user equipment.

The present invention further relates to user equipment for communication with a wireless communication system having an antenna unit with a plurality of antenna elements. The user equipment is arranged to receive and store a code for channel estimation support for communication with a selected serving antenna of said antenna unit so as to assign itself to said code. The user equipment is arranged to receive further transmissions associated to said code regardless of the selection of the serving antenna.

The present invention also relates to a method for assigning a channel to user equipment in a wireless communication system, comprising the steps of requesting a call related to user equipment, assigning a code for channel estimation support to said user equipment, selecting a serving set of antennas from a plurality of antenna elements for communication with said user equipment over the channel, and controlling communication with said user equipment over said selected serving set of antennas, said communication comprising said code for channel estimation support, wherein the steps of selecting the set of serving antennas and controlling the communication in accordance with said selection are repeatedly updated.

BRIEF DESCRIPTION OF THE DRAWINGS

FIG. 5 is a flowchart illustrating a method for assigning a secondary common pilot channel in the communication system of FIG. 1.

FIG. 6 is a flowchart illustrating a method for determining serving antenna(s) in the communication system of FIG. 1.

DETAILED DESCRIPTION

Figure 1:
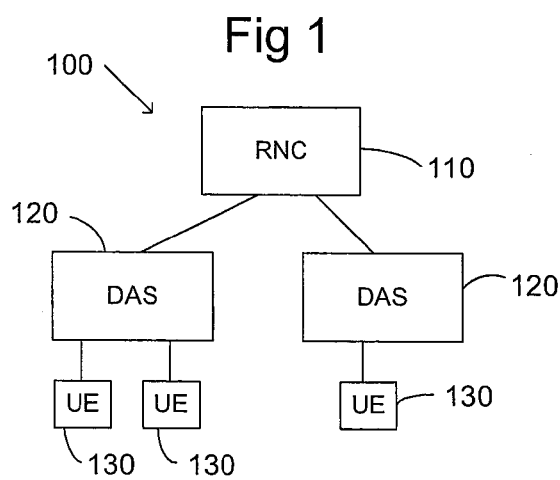
FIG. 1 is a block scheme illustrating an indoor communication system.

In FIG. 1, an indoor communication system 100 comprises a Radio Network Controller (RNC) 110, and at least one Distributed Antenna System DAS with RF switching 120. The Distributed Antenna System DAS with RF switching 120 is arranged to serve user equipment 130 within a space served by said indoor communication system. In one example, the indoor communication system is a WCDMA indoor system.

Figure 2:
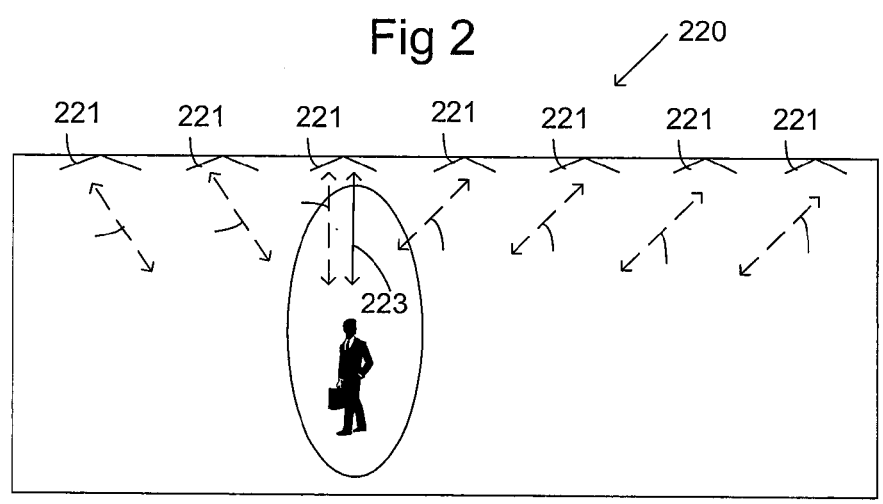
FIG. 2 is a side view of a distributed antenna system with RF switching of the indoor communication system in FIG. 1.

In FIG. 2, a Distributed Antenna System (DAS) with RF switching 220 comprises seven antenna elements 221 defining a logical cell. The RF switching configuration defining the logical cell is in one example part of a DAS RF switching indoor system.

All antennas of the cell are arranged to transmit a primary common pilot channel (P-CPICH). The P-CPICH is a downlink channel typically having constant power and of a known bit sequence. In the illustrated example, only one antenna is selected so as to receive and transmit dedicated information to user equipment. A secondary common pilot channel (S-CPICH) 223 is transmitted from the selected antenna to the user equipment. Also the S-CPICH is a downlink channel typically having constant power and of a known bit sequence. As the S-CPICH is transmitted only from the selected antenna, it is the S-CPICH which is used for channel estimation reasons. Accordingly, the S-CPICH provides channel estimation support and can act as phase reference for the selected antenna transmission. The secondary common pilot channel (S-CPICH) 223 is associated to the user equipment. Accordingly, as the user equipment moves, the selected serving antenna is changed. The S-CPICH 223 is following the movement of the user equipment and is kept unchanged.

Figure 3:
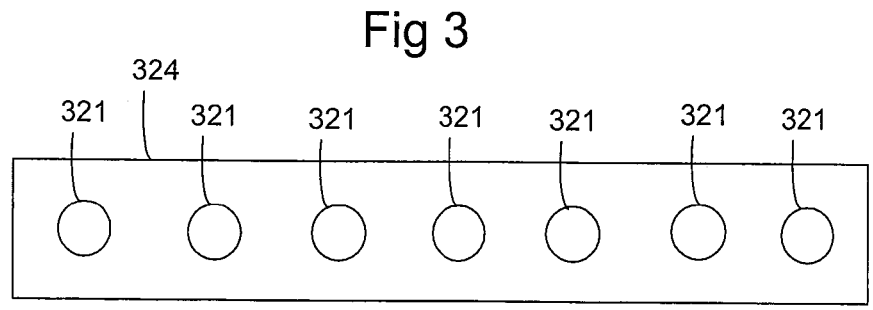
FIG. 3 shows schematically the antenna elements of the distributed antenna system in FIG. 2.

In FIG. 3, the distributed antenna system 324 defining a logical cell comprises a plurality of antenna elements 321. In the illustrated example, the distributed antenna system 324 comprises seven antenna elements 321. The antenna elements are arranged to transmit and to receive signals.

Figure 4:
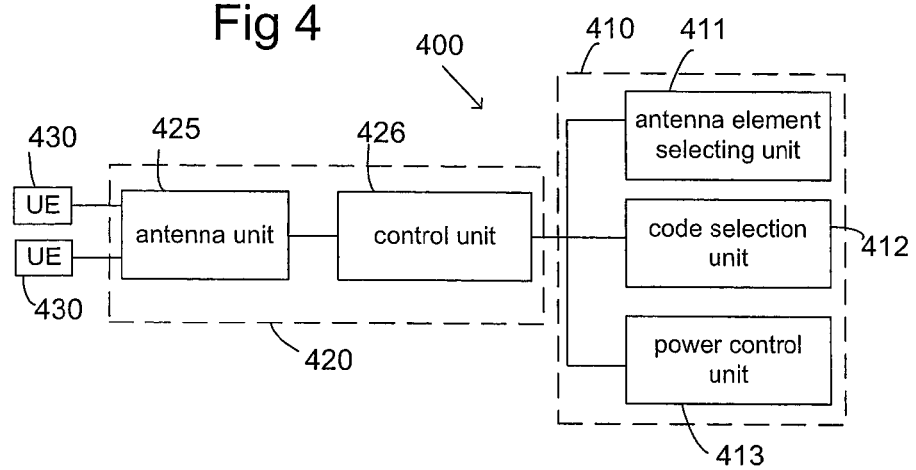
FIG. 4 is a block scheme over the distributed antenna system and a radio network controller of the communication system in FIG. 1.

In FIG. 4, an indoor communication system 400 comprises a distributed antenna system 420 comprising an antenna unit 425 having a plurality of distributed antenna elements, and a control unit 426 arranged to control communication with user equipment 430 over the antenna elements. The control unit 426 is further connected to an antenna element selecting unit 411. The antenna element selecting unit 411 is in the illustrated example comprised in a radio network controller 410. In an alternative example (not shown), it is comprised in the distributed antenna system 420. The control unit 426 is arranged to control at least downlink transmissions of the antenna unit 425 based on information from the antenna element selection unit 411. The antenna element selecting unit 411 is arranged to select one or a plurality of serving antennas for user equipment 430 based on signals received at the antenna elements.

In one example, the antenna selecting unit 411 is arranged to select serving antenna(s) for downlink communication, such as for the secondary common pilot channel (S-CPICH). Additionally, the antenna selecting unit is in one example also arranged to select serving antenna(s) for uplink communication. The operation of the antenna element selecting unit is described more in detail in relation to FIG. 6.

The control unit 426 is further connected to a code selecting unit 412. The code selecting unit 412 is arranged to allocate codes used as for channel estimation support to the user equipment. The code selecting unit 412 is arranged to select a unique code for assignment to each peace of user equipment reachable by the distributed antenna system 420. However, the codes can be reused so that pieces of user equipment positioned at a distance from each other such that transmissions to said pieces of equipments is not interfered, can be associated to the same code. In one example, an interference matrix or the like is implemented in the code selecting unit 412 for reuse of codes. In one example, the number of rows and columns in the matrix is equal to the number of antenna elements in the distributed antenna unit 425. Accordingly, the interference matrix provides information related to the expected level of interference between two antenna element pairs, i.e. a measure of the level of interference received from a first antenna element in said pair when located in the coverage area of the second antenna element. In one example, the interference matrix is built-up from uplink signal and downlink signal measurements. In an alternative example, the interference matrix is built-up only from uplink signal measurements.

The code selecting unit 412 is in one example arranged to perform the assignment of codes in the distributed antenna system 420 by means of the code reuse matrix and one or a plurality of other rules. Examples of those rules are described below. In accordance with one rule, for S-CPICH, all codes are allocated before reuse of codes using the S-CPICH code reuse matrix (downlink) is allowed. In accordance with a second rule, once reuse of codes is allowed, the S-CPICH giving minimum interference to the user that will be assigned a reused S-CPICH is selected for the user. Note that there might be a situation where S-CPICH has to be re-assigned for a user when two users with the same S-CPICH are moving towards each other (spatially and interference wise).

In accordance with one rule, the code selecting unit 412 is in one example arranged to dedicate a subset of all the S-CPICHs for "call setup" wherein characteristically substantially all antenna elements are used as serving antennas. As will be explained more in detail below, at call-setup the position of the user equipment is unknown, and a single or very limited number of serving antennas can not be used. The codes in this subset are in one example not code reused. When the position of user equipment is known, and a limited number of serving antennas is used, a new S-CPICH is assigned to the user equipment. The new S-CPICH belongs to a second subset of S-CPICHs which can be code reduced.

Alternatively, the code selecting unit 412 is arranged to assign the P-CPICH for channel estimation support during call setup. After call setup, when the position of user equipment is known, and a limited number of serving antennas are used, the code selecting unit 412 is then arranged to move the user equipment to an S-CPICH. In this case, all S-CPICHs are reusable.

In yet another alternative rule, the user equipment is arranged to allocate a reusable S-CPICH to the user equipment at call set up, wherein no reassignment of S-CPICH is performed after call setup.

In one example, the downlink SIR/SNIR (Signal to Interference Ratio/Signal to Noise and Interference Ratio) values form a downlink interference matrix that can be used to determine if downlink code reuse is possible for S-CPICH. In an alternative example, BER (Bit Error Rate) values are used for forming the interference matrix. In yet another example, BLER (Block Error Rate) values are used for forming the interference matrix. A combination of the above mentioned measures (SIR/SNIR, BER, BLER) and/or other quality measures can be used for forming the interference matrix. However, the values used for forming the interference matrix for S-CPICH can in one example be used for forming interference matrices also for HSDPA and/or DCH etc. Different threshold values can be used for reuse of different codes. For example, S-CPICH would require a higher threshold since it is more important. Accordingly, several code reuse interference matrices are derived, one for each type of code. Accordingly, DCH allocation is based on a downlink DCH code reuse matrix. Further, the HSDPA code allocation (reuse of codes) follows in accordance with this example an HSDPA downlink code allocation matrix.

The code selecting unit 412 is in the illustrated example implemented in the radio network controller 410. The code selecting unit 412 is in an alternative example (not shown) implemented in the distributed antenna system 420. The operation of the code selecting unit is described in more detail in relation to FIG. 5.

The control unit 426 is further connected to a unit for power control 413. The unit for power control 413 is herein described essentially in relation to power control of the secondary common pilot channel. The power control unit 413 is arranged to perform power control so as to maximize the remaining amount of downlink power to be used for dedicated or shared channels i.e. minimizing the utilized overhead resources for S-CPICH support. Accordingly, the power control unit 413 is in one example arranged to reduce the transmitting power for each S-CPICH for user equipment in a favourable position and increasing the transmitting power when experiencing bad/degradation in quality. The power control is possible since an S-CPICH code is in principal devoted/dedicated/used by only one piece of user equipment and is not shared with others (which is the case with a fixed S-CPICH allocation per antenna). The unit for power control 413 is in the illustrated example implemented in the radio network controller 410. In an alternative example (not shown), the unit for power control 413 is implemented in the distributed antenna system 420. The operation of the unit for power control is described more in detail in relation to FIG. 7.

In FIG. 5, a method 550 for assigning an S-CPICH to user equipment comprises a first step 551, wherein the user equipment requests a call. In a second step 552, the code selecting unit 412 is arranged to signal an S-CPICH to the user equipment. In a third step 553, the user equipment receives the S-CPICH and the S-CPICH is assigned to the user equipment. If the code selection unit 412 operates in accordance with a rule (as was described in relation to FIG. 4), wherein a new S-CPICH is assigned to the user equipment after call up, the code selection unit 412 is arranged to signal the new S-CPICH to the user equipment in a fourth step 554 after the call up phase is over. In one example, the call up phase is over when the antenna element selecting unit 411 has selected one or a few serving antennas. The user equipment receives in a fifth step 555 the S-CPICH and the S-CPICH is assigned to the user equipment. If the codes can be reused, the method comprises further a sixth step 556 of signalling a new S-CPICH to the user equipment if the code selecting unit 412 has detected interference with another user based on the interference matrix. The user equipment receives in a seventh step 557 the new S-CPICH and the new S-CPICH is assigned to the user equipment.

In FIG. 6, a method 660 for determining serving antenna elements for at least downlink communication with the user equipment is described. Generally, until the antenna element or set of antenna elements that essentially covers the user equipment is determined, all antenna elements are in one example used for the downlink transmissions. This will likely be the situation in the initial phase of the connection of the user equipment. The number of antenna elements for downlink transmissions in the serving set of antenna elements can then be gradually decreased due to improved knowledge gained by measurements. Further, the set of antenna elements is continuously updated during the connection time due to continuing measurements. As was described in relation to FIG. 4, the selection of antenna element is performed in an antenna element selecting unit 411.

In detail, the method 660 for determining serving antenna elements for the communication with the user equipment comprises in a first step 661, that the user equipment requests a call setup. At radio link (call) set up, the position of the user equipment is likely to be unknown. Therefore, a serving antenna element or serving set of antenna elements for downlink transmissions need to be determined as soon as possible so as to optimize performance. Accordingly, in a second step 662, the uplink transmissions from the new user equipment, which requests a call setup are actively received by substantially all antenna elements. Those first uplink transmissions comprise for example random access, paging on DL or radio-link setup messages with associated response by the user equipment.

In a third step 663, the reception condition for each antenna element is determined. In one example, the reception condition is based on a power level. Accordingly, a power level at each antenna element receiving the uplink communications is determined. The set of serving antenna elements is in one example then determined in a fourth step 664 based on said determined power levels. Thus, those or that antenna element receiving the signal with a power level exceeding a power level threshold value is/are selected as the serving antenna element(s).

In another example, the reception condition is based on the quality of the received signals. Accordingly, a signal quality measure at each antenna element receiving the uplink communications is measured. The signal quality measure is for example a SNR (Signal to Noise Ratio), SIR, BER, BLER or the like. The set of serving antenna elements can then be determined in the fourth step 664 based on said determined quality measures. Thus, those or that antenna element receiving the signal with a quality exceeding a signal quality threshold value is/are selected as the serving antenna element(s).

In yet another example, both the power level and the signal quality of the uplink communications are measured and the serving set of antenna elements is determined in the fourth step 664 based on a combination of the power level and the signal quality at the receiving antenna elements.

If a difference in the power level and/or signal quality can not be distinguished between the different receiving antenna elements so as to enable a determination of the serving set of antennas, then the power level and/or signal quality in further uplink communications such as speech or data transfers is measured so as to enable selection of the serving set of antenna elements. However, hopefully, the antenna elements can be selected during the call-setup procedure (i.e. during signalling to establish a call). In one example, the power level/signal quality of the further uplink communications is measured so as to improve the selection of the serving set of antenna elements. Further, the power level/signal quality of the further uplink communications is measured so as to detect changes in the reception conditions for example due to movements of the user equipment.

In one example, the user equipment is arranged to measure CQI (Channel Quality Indicator) for HSDPA. Those measures are transmitted to the antenna selecting unit for use as quality measure in selecting antenna element(s). In an alternative example, downlink BLER is measured by the radio network controller and is used by the antenna selecting unit for use as quality measure in selecting antenna element(s).

In one example, the antenna element selecting unit 411 is arranged to refine the selection of serving antenna elements for at least downlink communication in accordance with the following. In a fifth step 665, a potential set of serving antenna elements is determined. The potential set of serving antenna elements is an updated set of antenna elements. The updating of the serving set of antenna elements is in one example performed by means of removal of antenna element(s). In an alternative example, the updating of the serving set of antenna elements is in one example performed by extending the potential set of serving antenna elements so as to handle movements of user equipment. In a sixth step 666, uplink signals are received from the user equipment. In a seventh step 667, the reception condition is measured (power level and/or signal quality) related to communication between the user equipment and each antenna element of the potential set of serving antenna elements. If it is determined that a degradation has occurred in relation to the selected set of antenna elements, the selected set of serving antenna elements is reselected in a ninth step 669 and the process jumps back to the fifth step 665, wherein a new set of potential serving antenna elements is formed. If no substantial degradation has been detected, the potential set of serving antenna elements is selected as the current set of serving antenna elements in an eighth step 668. Accordingly, in a case wherein antenna elements are removed in the fifth step 665, the effect on the quality measure from the removal of the antenna element(s) is monitored in the sixth and seventh steps 667, 668. If the downlink quality is substantially degraded, the removed antenna element(s) is (are) reselected in the serving set of antenna elements in a ninth step 669. If on the other hand, the downlink quality is substantially not degraded, one or more additional antennas are removed in the fifth step.

In case of an out of order operation, communication failures or errors detected in the antenna elements to use, in one example, one fall back alternative is to utilize all available antennas. The antenna selection process for example as defined in relation to FIG. 5 can then be resetted and restarted. Similar, as discussed for the downlink transmission, the receive antennas actively used for user equipment data detection in the uplink is in one example also reduced. The number of uplink receiving antennas can then be gradually reduced as the knowledge of the position of the user equipment is gradually increasing. However, opposite to the downlink where the reduction of superfluous transmissions is essential to reach optimum performance, uplink detection process always benefits from receiving signals from a plurality of antennas. The basic principal is to receive with all but transmit with one or a few antennas. But, even in spite of the argumentation above it may be beneficial to reduce and limit the number of antenna signals used in the detection process for user equipment. In particular, such reduction of receiver complexity can be valuable in an example with pooled common detection resources for all users associated to the distributed antenna system. The requirement on detection resource implementation can then be substantially reduced.

Figure 7:
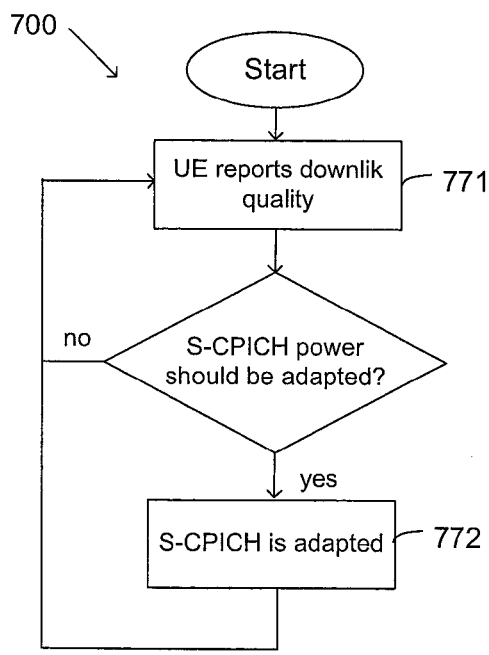
FIG. 7 is a flowchart illustrating a method for power control of the secondary common pilot channel in the communication system of FIG. 1.

In FIG. 7, a method 700 for power control of the S-CPICH is illustrated, wherein said power control being performed so as to maximize the remaining amount of downlink power to be used for dedicated or shared channels. Accordingly, the radio network controller can be arranged to reduce the transmitting power for each S-CPICH for user equipment in a favourable position and increasing the transmitting power when experiencing bad/degradation in quality. The power control is possible since a CPICH code is in principal devoted/dedicated/used by only one piece of user equipment and is not shared with other user equipment (which is the case with a fixed S-CPICH allocation per antenna). The method comprises a first step 771 of determining a measure related to the quality of the S-CPICH. In the illustrated example, the user equipment is arranged to report in the first step downlink quality (CQI) to the radio network controller. In one example, the downlink quality is reported via the uplink for the HSDPA transport format selection. In one example, the power control mechanism for DCH services is applied for the S-CPICH as well. Alternatively, the measure related to the quality of the S-CPICH is determined based on quality measurements of the uplink signals received by the antenna elements. In a second step 772, the radio network controller is arranged to control the transmission power of the S-CPICH in accordance with said quality measure.

The invention is of course not in any way limited to the illustrated example herein described. On the contrary, several possibilities of modifications thereof should be apparent to a person skilled in the art without therefore deviating from the basic idea of the invention as defined in the appended claims. For example, the technique herein described is applicable both to indoor and outdoor systems comprising a distributed antenna system.

The invention claimed is:

1. A Wireless communication distributed antenna system, comprising:
   an antenna unit comprising a plurality of antenna elements;
   and a radio network controller including:
   a selector arranged to select at least one of the antenna elements as serving antenna for communication with user equipment,
   a code allocator arranged to allocate a code for channel estimation support for said communication between the serving antenna and the user equipment,
   and a control unit arranged to control said communication based on the selected serving antenna and the allocated code,
   wherein the code allocator is arranged to assign the code to said user equipment and the control unit is arranged to control the serving antenna so as to transmit the code assigned to the user equipment, wherein the code allocator is further arranged to determine interference between communication channels to different pieces of equipment and to assign the same code to a plurality of pieces of equipment in consideration of said determined interference, and wherein the code selector unit is further arranged to determine an interference matrix that provides an expected level of interference between each pair of antenna elements included in the plurality of antenna elements.

2. The wireless communication distributed antenna system according to claim 1, wherein said selector is arranged to continuously update the selection of serving antenna for communication with said user equipment.

3. The wireless communication distributed antenna system according to claim 1, wherein said selector is arranged to select serving antenna for downlink communication.

4. The wireless communication distributed antenna system according to claim 1, comprising a power control unit arranged to control transmission of the code for channel estimation support.

5. The wireless communication distributed antenna system according to claim 1, wherein the wireless communication system is a Wideband Code Division Multiple Access (WCDMA) indoor system.

6. The wireless communication distributed system according to claim 5, comprising a secondary pilot channel (S-CPICH) that carries the code for channel estimation support.

7. The wireless communication distributed antenna system according to claim 1, wherein the determined interference comprises a measure of the level of interference received from a first antenna element in a pair of antennas when located in the coverage area of a second antenna element, wherein the interference measure is built-up from uplink signal and downlink signal measurements.

8. The wireless communication distributed antenna system according to claim 1, wherein the code allocator has access to a predetermined number of codes and is farther arranged to assign a subset of said codes to only one piece of user equipment at the same time.

9. The wireless communication distributed antenna system according to claim 8, wherein said subset of codes is dedicated for a call setup phase.

10. A radio network controller (RNC) for a wireless communication distributed antenna system having an antenna unit with a plurality of antenna elements, said RNC comprising:
    a selector arranged to select at least one of the antenna elements as serving antenna for communication with user equipment;
    and a code allocator arranged to allocate a code for channel estimation support for communication between said serving set of antennas and the user equipment, wherein the code allocator is arranged to assign the code to said user equipment, and the selector is arranged to select the serving antenna for transmission of the code assigned to the user equipment, wherein the code allocator is further arranged to determine interference between communication channels to different pieces of equipment and to assign the same code to a plurality of pieces of equipment in consideration of said determined interference, and wherein the code selector unit is further arranged to determine an interference matrix that provides an expected level of interference between each pair of antenna elements included in the plurality of antenna elements.

11. The RNC according to claim 10, wherein said selector is arranged to continuously update the selection of serving antenna for communication with said user equipment.

12. A method for assigning a channel for communication with user equipment in a wireless communication distributed antenna system, comprising the steps of:
    receiving a request for a call from a user equipment,
    assigning a code for channel estimation support to a channel,
    selecting a serving set of antennas from a plurality of antenna elements for communication with said user equipment over said channel,
    and controlling communication with said user equipment over said selected serving set of antennas, said communication comprising said code for channel estimation support, wherein
    the step of assigning a code for channel estimation support comprises assigning a code to the user equipment, and the step of assigning a code comprises determining interferences between communication channels related to different pieces of user equipment and to assign the same code as already used by another piece of equipment based on the determined interference with said another piece of equipment, and wherein the code selector unit is further arranged to determine an interference matrix that provides an expected level of interference between each pair of antenna elements included in the plurality of antenna elements.

13. The method for assigning a channel to user equipment according to claim 12, wherein the step of selecting serving set of antennas comprises measuring reception conditions at the antenna elements and selecting the serving set of antennas based on said measurements.

14. The method for assigning a channel to user equipment according to claim 12, wherein the step of assigning code for channel estimation support comprises assigning a first code during setup of the call and a second code after setup of the call.

15. The method for assigning a channel to user equipment according to claim 12, wherein the determined interference comprises a measure of the level of interference received from a first antenna element in a pair of antennas when located in the coverage area of a second antenna element, wherein the interference measure is built-up from uplink signal and downlink signal measurements.

16. The method for assigning a channel to user equipment according to claim 15, wherein the step of assigning a code comprises repeatedly determining interference between communication channels related to those pieces of user equipment assigned to the same code and to assign a new code to one of the pieces of user equipment based on the determined interference.

17. The method for assigning a channel to user equipment according to claim 14, wherein each piece of user equipment is assigned to a unique first code, which first code is not assignable to any other user equipment while assigned to said piece of user equipment.

18. The method for assigning a channel to user equipment according to claim 12, wherein the code for channel estimation support is power controlled.

19. The method for assigning a channel to user equipment according to claim 12, wherein the steps of selecting the serving set of antennas and controlling the communication in accordance with said selection are repeatedly updated.

* * * * *

UNITED STATES PATENT AND TRADEMARK OFFICE
CERTIFICATE OF CORRECTION

PATENT NO. : 8,923,318 B2
APPLICATION NO. : 13/121746
DATED : December 30, 2014
INVENTOR(S) : Kronestedt et al.

Page 1 of 1

It is certified that error appears in the above-identified patent and that said Letters Patent is hereby corrected as shown below:

Fig. 7, Drawing Sheet 2 or 4, for tag "771", line 1, delete "downlik" and insert -- downlink --, therefor.

In the specification

Column 5, Line 7, delete "peace" and insert -- piece --, therefor.

In the claims

Column 9, Line 31, Claim 1, delete "Wireless" and insert -- wireless --, therefor.

Column 10, Line 5, Claim 6, delete "system" and insert -- antenna system --, therefor.

Column 10, Line 18, Claim 8, delete "farther" and insert -- further --, therefor.

Signed and Sealed this
Twentieth Day of October, 2015

Michelle K. Lee
*Director of the United States Patent and Trademark Office*